United States Patent
An et al.

(10) Patent No.: US 7,304,933 B2
(45) Date of Patent: Dec. 4, 2007

(54) OPTICAL RECORDING APPARATUS USING SCANNING MIRROR FOR GENERATING TWO-DIMENSIONAL BEAM

(75) Inventors: Jun-Won An, Kyunggi-do (KR); Sang Kyeong Yun, Kyunggi-do (KR); Jong-Su Yi, Kyunggi-do (KR); Dong-Ho Shin, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 606 days.

(21) Appl. No.: 10/952,247

(22) Filed: Sep. 28, 2004

(65) Prior Publication Data
US 2005/0270954 A1 Dec. 8, 2005

(30) Foreign Application Priority Data
Jun. 7, 2004 (KR) .................. 10-2004-0041420

(51) Int. Cl.
*G11B 7/00* (2006.01)
(52) U.S. Cl. .................. 369/103; 359/212; 359/216
(58) Field of Classification Search ........... 369/103; 359/212–216
See application file for complete search history.

(56) References Cited

U.S. PATENT DOCUMENTS 6,064,586 A 5/2000 Snyder et al.
7,075,692 B2* 7/2006 Sato et al. .................. 359/215
7,130,092 B1* 10/2006 Horimai ..................... 359/35
7,182,466 B2* 2/2007 Sunaga ....................... 353/70
2005/0237896 A1* 10/2005 Tachibana et al. .......... 369/103

FOREIGN PATENT DOCUMENTS

KR  1020030092473 A  12/2003

* cited by examiner

*Primary Examiner*—Thang V. Tran
*Assistant Examiner*—Vanessa Coleman
(74) *Attorney, Agent, or Firm*—Christensen O'Connor Johnson Kindness PLLC (57) ABSTRACT

The present invention relates to an optical recording apparatus, which converts a one-dimensional signal beam into a two-dimensional signal beam using a scanning mirror at the time of recording data on a holographic recording medium, etc., thus greatly reducing required manufacturing processes when manufacturing a spatial light modulator. The optical recording apparatus includes a light generation and radiation means for generating beams, and dispersing and radiating the beams in two directions. A reference beam radiation means converts radiation angles of reference beams and radiates the reference beams having different angles onto a recording medium. A one-dimensional signal beam generation means diffracts and spatially modulates the beams incident from the light generation and radiation means to generate a one-dimensional signal beam and radiates the one-dimensional signal beam. A two-dimensional signal beam radiation means reflects the one-dimensional signal beam in two directions on the same horizontal plane and radiates a two-dimensional signal beam onto the recording medium.

12 Claims, 7 Drawing Sheets

OPTICAL RECORDING APPARATUS USING SCANNING MIRROR FOR GENERATING TWO-DIMENSIONAL BEAM

BACKGROUND OF THE INVENTION

1. Field of the Invention

The present invention relates, in general, to optical recording apparatuses using a scanning mirror for generating a two-dimensional beam and, more particularly, to a holographic optical recording apparatus, which can convert a one-dimensional signal beam into a two-dimensional signal beam using a scanning mirror at the time of recording data on a holographic recording medium, etc.

2. Description of the Related Art

Recently, a holographic digital data storage system using a semiconductor laser, a Charge Coupled Device (CCD), a Liquid Crystal Display (LCD), etc. has been actively researched/developed. Since the holographic digital data storage system is advantageous in that it has a large storage capacity and very high data transfer rate, not only is it utilized for fingerprint recognition devices for storing and reproducing fingerprints, display devices, etc., but also the application fields thereof have been gradually extended.

Such a holographic digital data storage system allows object light, transmitted from an object, and reference light to interfere with each other, records interference patterns generated due to the interference in a storage medium, such as an optical refractive crystal or polymer that differently reacts to the amplitude and phase of interference patterns, and stores three-dimensional holographic digital data in pages each composed of binary data.

Further, the holographic digital data storage system reproduces the stored three-dimensional data by intercepting the object light and providing only the reference light to the storage medium. The holographic digital data are generally recorded and reproduced in pages in the form of rectangular image data having the shape identical to that of a display screen. However, since alignment is required for precise reproduction, alignment marks are formed on the edges of a holographic data page. In this case, when the alignment marks on the data page are formed as images on a CCD in a pixel-to-pixel manner, light spreads to a neighboring pixel due to the alignment marks if the alignment is not precisely performed, thus causing a problem in that it is impossible to precisely measure alignment. In order to solve the problem, U.S. Pat. No. 6,064,586 proposes a new alignment method for holographic data storage and retrieval, in which alignment marks are boldly indicated on opposite vertical lines formed on the pixels of a holographic data page by three columns, and alignment is performed using the boldly indicated marks. However, there is a limitation in that it is difficult to precisely measure alignment using the alignment marks on pixels due to the characteristics of the holographic data recording and reproduction apparatus that measures alignment within a range of ±0.5 pixel.

Figure 1:
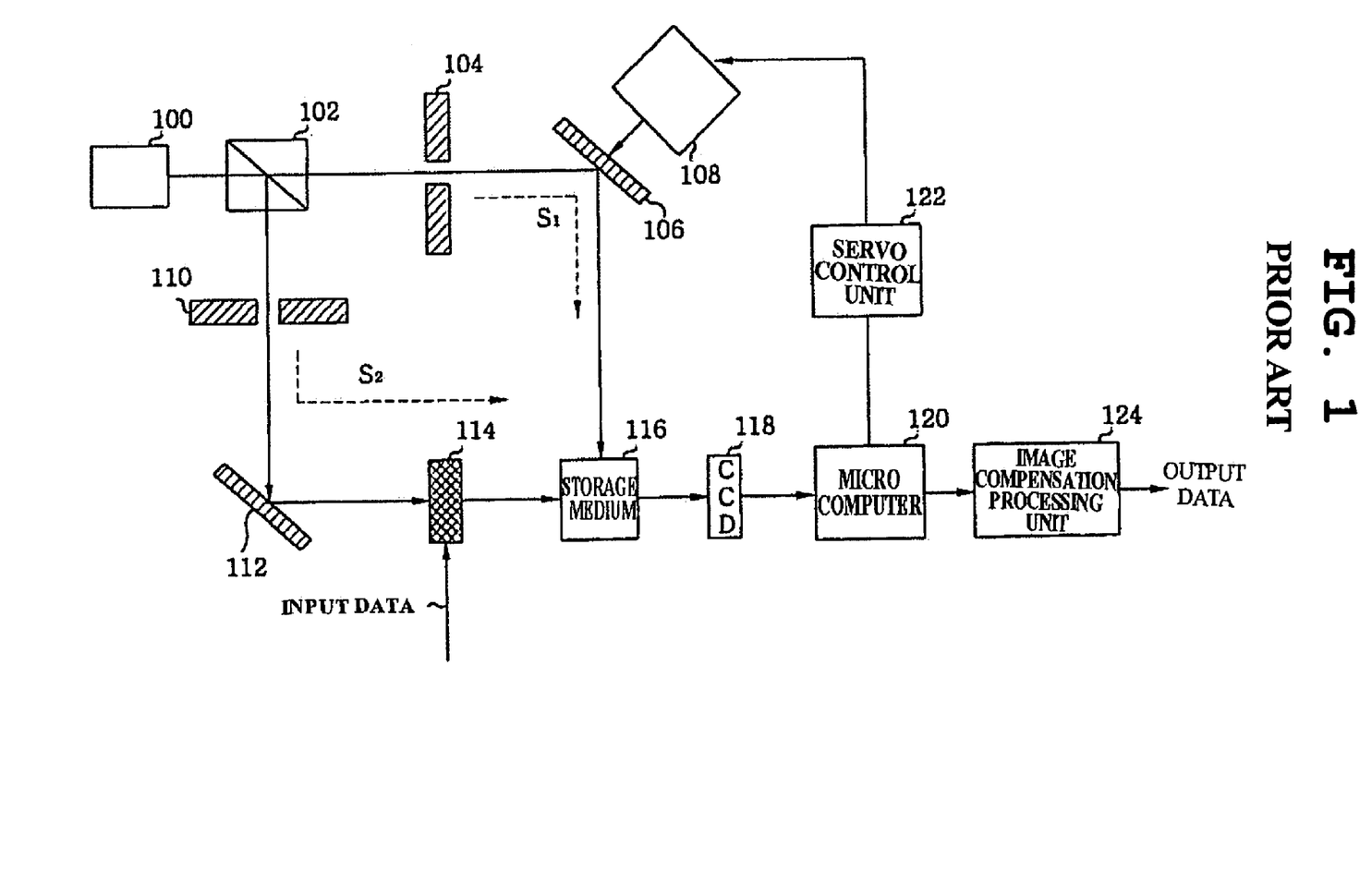
FIG. 1 is a view showing the construction of a conventional holographic data recording and reproducing apparatus.

In order to overcome the limitation, as shown in FIG. 1, Korean Pat. Appl. No. 2002-30147 proposes a holographic data recording and reproduction apparatus, which obtains the regression lines of edges in each page using Fourier approximation with respect to pixels inserted to perform alignment in a data page, and controls an actuator for adjusting a reference light angle depending on the pixels in each page, the location of regression lines and the difference in slopes, thus automatically controlling the alignment of the data page.

FIG. 1 is a view showing the construction of a conventional holographic data recording and reproduction apparatus.

Referring to FIG. 1, the conventional holographic data recording and reproduction apparatus includes a light source 100, an optoisolator 102, shutters 104 and 110, reflectors 106 and 112, a spatial light modulator 114, an actuator 108, a storage medium 116, a CCD 118, a microcomputer 120, a servo control unit 122, and an image compensation processing unit 124.

A process of automatically aligning data pages in the conventional holographic data recording and reproduction apparatus having the above construction is described.

First, the conventional holographic data recording and reproduction apparatus radiates only a reference beam having a set recording angle onto the storage medium 116 at the time of data reproduction, reproduces a holographic digital data page and transmits the holographic digital data page to the CCD 118. Then, the microcomputer 120 selects one row or column from the data page transmitted from the CCD 118, and performs automatic alignment for the data page. The microcomputer 120 approximates the alignment mark region of the selected row or column using the continuous function of row or column data values.

That is, the microcomputer 120 approximates the alignment mark region using the continuous function of the row or column data values of the data page so as to process a holographic image at a sub-pixel level. At this time, the Fourier approximation is used as the approximation method, and it is noted in the Fourier approximation that the number of harmonics must be equal to or less than ½ of the number of data values.

Further, when a vertical alignment mark is intended to be measured using row pixels, an angle approaches 90°, so that a term of the partial differentiation of y should be deleted. Next, the microcomputer 120 performs second order differentiation with respect to the approximated function and obtains the first or second edge value of the data page. In order to detect the edge of the data page, the second order differentiation is used, and a point where the value, obtained from the second order differentiation of the approximated function, becomes "0", that is, an inflection point, is an edge. That is, the first edge value is a value when the approximated function is maximal and becomes "0", and indicates a left edge. The second edge value is a value when the approximated function is minimal and becomes "0", and indicates a right edge.

In the meantime, the conventional holographic data recording and reproduction apparatus may use both first and second edge values, or any one of them at the time of obtaining the edge values of the data page.

The microcomputer 120 selects a row or column from the data page, obtains each approximated function from the row following the selected row to the last row, or from the column following the selected column to the last column, performs second order differentiation with respect to each approximated function, and obtains each first or second edge value. Next, the microcomputer 120 obtains the regression lines of the first and second edge values of the rows or columns using a fitting method, such as a least squares method. If an alignment mark to be measured is precisely in the center of the left and right edges, the alignment mark is obtained by calculating a mean of the left and right edges.

If the location or slope of the regression line does not have a distance or slope set based on a predetermined position on the data page, the microcomputer 120 controls the server control unit 122 of the actuator 108, adjusting the angle of a reference beam, to automatically align a holographic data page.

For example, if the measured location of the regression line deviates from a distance of a normal data page added to 0.5 pixels by 7 pixels, the servo control unit 122 causes the actuator 108 to be moved by −7 pixels and the data page to be reproduced. Then, the data page reproduced by the CCD 118 is precisely reproduced within a 0.5 pixel range.

In the meantime, if the location or slope of the regression line does not have a distance or slope set based on a predetermined location on the data page, the microcomputer 120 transmits the data page to the image compensation processing unit 124 and executes digital signal processing, thus compensating for the image on the holographic data page. That is, the image compensation processing unit 124 moves the image on the data page by a difference between the measured location or slope of the regression line and the location or slope set based on the predetermined location on the data page, so that automatic alignment can be performed.

In the meantime, the above-described conventional holographic optical recording apparatus uses a scheme of spatially modulating information recorded on a holographic recording medium into two-dimensional information using a two-dimensional liquid crystal, a micron mirror array, a Grating Light Valve (GLV), etc. However, if the above scheme is used, there are several problems in that a large number of manufacturing processes are required and circuit construction is complicated when a two-dimensional spatial light modulator is modulated.

SUMMARY OF THE INVENTION

Accordingly, the present invention has been made keeping in mind the above problems occurring in the prior art, and an object of the present invention is to provide a holographic optical recording apparatus, which converts a signal beam shape using a scanning mirror at the time of recording data on a holographic recording medium, etc., thus easily converting a one-dimensional signal beam into a two-dimensional signal beam.

Another object of the present invention is to provide an optical recording apparatus, which converts a one-dimensional signal beam into a two-dimensional signal beam using a scanning mirror at the time of recording data on a holographic recording medium, etc., thus greatly reducing required manufacturing processes when manufacturing a spatial light modulator.

A further object of the present invention is to provide an optical recording apparatus, which converts a one-dimensional signal beam into a two-dimensional signal beam using a scanning mirror at the time of recording data on a holographic recording medium, etc., thus minimizing the number of circuit devices required to manufacture products and reducing manufacturing costs thereof.

In order to accomplish the above object, the present invention provides an optical recording apparatus, comprising light generation and radiation means for generating beams, and dispersing and radiating the beams in two directions; reference beam radiation means for converting radiation angles of reference beams incident from the light generation and radiation means at a certain angle and radiating the reference beams having different angles onto a recording medium; one-dimensional signal beam generation means for diffracting and spatially modulating the beams incident from the light generation and radiation means to generate a one-dimensional signal beam and radiating the one-dimensional signal beam; and two-dimensional signal beam radiation means for reflecting the one-dimensional signal beam radiated from the one-dimensional signal beam generation means in two directions on the same horizontal plane and radiating a two-dimensional signal beam onto the recording medium.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 2A:
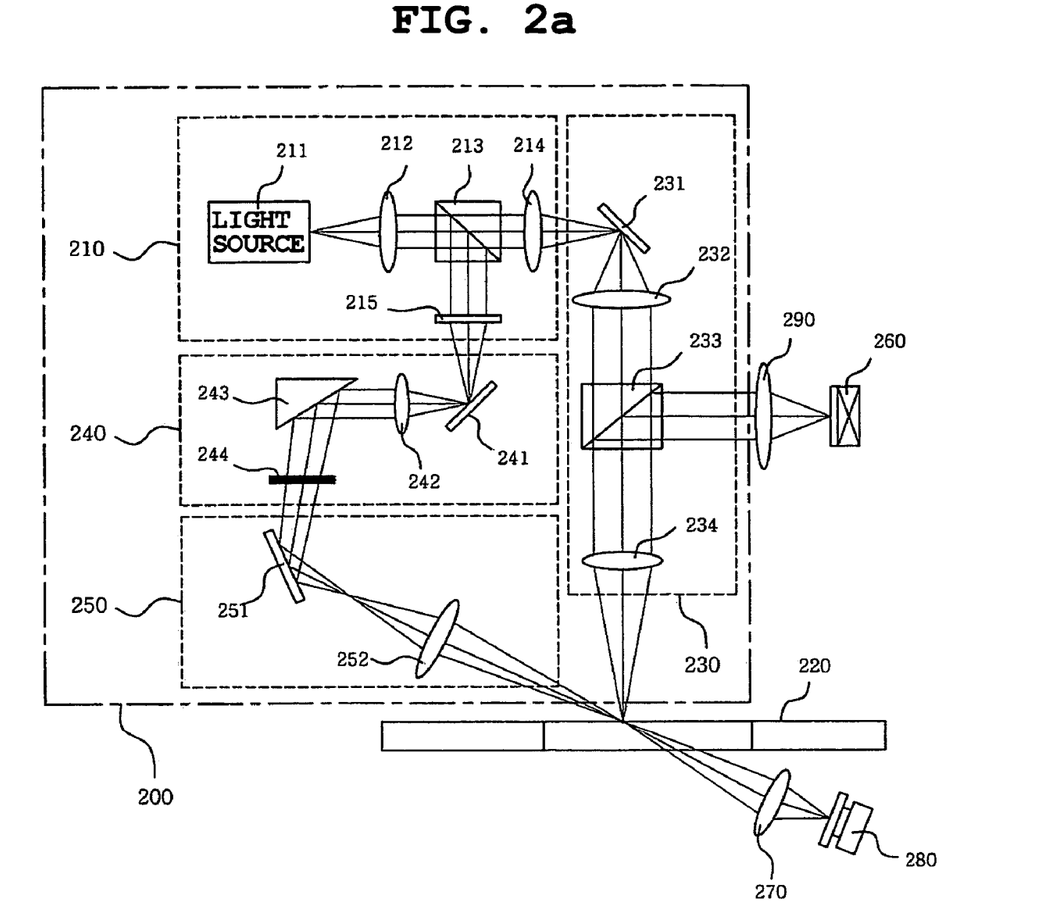
FIG. 2a is a view showing the construction of an optical recording apparatus using a scanning mirror for generating a two-dimensional beam according to an embodiment of the present invention.

FIG. 2a is a view showing the construction of an optical recording apparatus using a scanning mirror for generating a two-dimensional beam according to an embodiment of the present invention.

Referring to FIG. 2a, an optical recording apparatus 200 of the present invention includes a light generation and radiation unit 210 for generating beams and dispersing and radiating the generated beams in two directions, a reference beam radiation unit 230 for converting the radiation angles of reference beams, incident from the light generation and radiation unit 210 at a certain angle, and radiating the reference beams having different angles onto a holographic recording medium 220, a one-dimensional signal beam generation unit 240 for diffracting and spatially modulating the beams incident from the light generation and radiation unit 210 to generate a one-dimensional signal beam, and radiating the one-dimensional signal beam, and a two-dimensional signal beam radiation unit 250 for reflecting the one-dimensional signal beam radiated from the one-dimensional signal beam generation unit 240 in two directions on the same horizontal plane directions, and radiating a two-dimensional signal beam onto the holographic recording medium 220.

The light generation and radiation unit 210 includes a light source 211 for generating the beams, at least one collimator lens 212 for converting the beams generated by the light source 211 into parallel beams, a beam splitter 213 for allowing reference beams among the beams, converted into parallel beams by the collimator lens 212, to pass therethrough and reflecting beams other than the reference beams, a focusing lens 214 for focusing the beams passed through the beam splitter 213 onto the reference beam radiation unit 230, and a cylindrical lens 215 for radiating the beams reflected by the beam splitter 213 onto the one-dimensional signal beam generation unit 240.

The light source 211 may be implemented using a laser or Laser Diode (LD) for generating laser beams. In this case, the LD, which is the light source 211, has a relatively low output. The reason for this is that the light source 211 simultaneously radiates a plurality of beams, and the radiation time of the LD required for exposure is allowed to be long with respect to a single pixel.

The collimator lens 212 is disposed between the light source 211 and the beam splitter 213, and if two or more collimator lenses 212 are employed, the collimator lenses are arranged to be spaced apart from each other at regular intervals.

The reference beam radiation unit 230 includes a rotation stage 231 for rotating in a preset direction according to the execution of a predetermined program and reflecting the reference beams, incident at a certain angle from the light generation and radiation unit 210, at different angles, a collimator lens 232 for converting the reference beams radiated at different angles by the rotation stage 231 into parallel beams, and radiating the parallel beams, a beam splitter 233 for allowing the reference beams radiated at different angles through the collimator lens 232 to pass therethrough and reflecting the beams, which are reflected and incident from the holographic recording medium 220, to an external photo detector 260, and a focusing lens 234 for focusing the reference beams having different angles passed through the beam splitter 233 and radiating the focused reference beams onto the holographic recording medium 220.

The one-dimensional signal beam generation unit 240 includes a one-dimensional diffractive light modulator 241 for diffracting and spatially modulating the beams radiated through the cylindrical lens 215 of the light generation and radiation unit 210 to generate a one-dimensional signal beam, a collimator lens 242 for converting the one-dimensional signal beam radiated from the one-dimensional diffractive light modulator 241 into a parallel beam and radiating the parallel beam, a reflector 243 for reflecting the one-dimensional signal beam radiated through the collimator lens 242, and a spatial filter 244 for magnifying the diameter of the one-dimensional signal beam reflected through the reflector 243.

The one-dimensional diffractive light modulator 241 can simultaneously control a minimum of two pixels to a maximum of several hundreds or thousands of pixels within a range allowed by an optical system. Further, the diffractive light modulator 241 can control pixels in an analog manner and perform gray control when the diffractive light modulator 231 is applied to printers and display products. In this case, the diffractive light modulator 241 controls an optical lens and an optical projection distance, so that the size of a corresponding spot and an interval between spots can be controlled.

Further, the signal beam radiated after being diffracted and modulated by the one-dimensional diffractive light modulator 241 is comprised of one or more signal arrays. In this case, one signal array generates a two-dimensional signal beam in association with a scanning mirror. Such a signal beam is radiated to a specific address of the holographic recording medium 220.

The two-dimensional signal beam radiation unit 250 includes a scanning mirror 251 for reflecting the one-dimensional signal beam radiated from the one-dimensional signal beam generation unit 240 in two directions on the same horizontal plane, and radiating a two-dimensional signal beam, and a focusing lens 252 for focusing the two-dimensional signal beam reflected from the scanning mirror 251 and radiating the focused signal beam onto the holographic recording medium 220.

The scanning mirror 251 is fastened to an electronic device performing a horizontal turning operation according to a preset program. Therefore, the electronic device turns the scanning mirror 251 in two directions on the same horizontal plane according to the preset program, thus enabling the one-dimensional signal beam incident on the scanning mirror 251 to be reflected in two directions on the same horizontal plane. Through such a reflecting process, the one-dimensional signal beam is converted into the two-dimensional signal beam by the scanning mirror 251.

The scanning mirror 251 may be implemented with a polygon mirror or Galvano mirror.

If the polygon mirror is used as the scanning mirror 251, the polygon mirror is characterized in that it moves the one-directional signal beam radiated from the one-dimensional signal beam generation unit 240 at a constant linear velocity. At this time, the focusing lens 252 deflects a diffracted two-dimensional signal beam, which is reflected from the polygon mirror and moves at a constant angular velocity, in a main radiation direction.

If the Galvano mirror is used as the scanning mirror 251, the Galvano mirror is characterized in that it moves a diffracted one-dimensional signal beam radiated from the one-dimensional signal beam generation unit 240 at a non-constant linear velocity. At this time, the focusing lens 252 deflects the diffracted one-dimensional signal beam, which is reflected from the Galvano mirror and moves at a non-constant angular velocity, in a main radiation direction.

The focusing lens 252 precisely focuses the two-dimensional signal beam radiated through the scanning mirror 251 onto a preset address of the holographic recording medium 220. This operation is performed to precisely record data forming the two-dimensional signal beam at the preset address of the holographic recording medium 220.

Figure 2B:
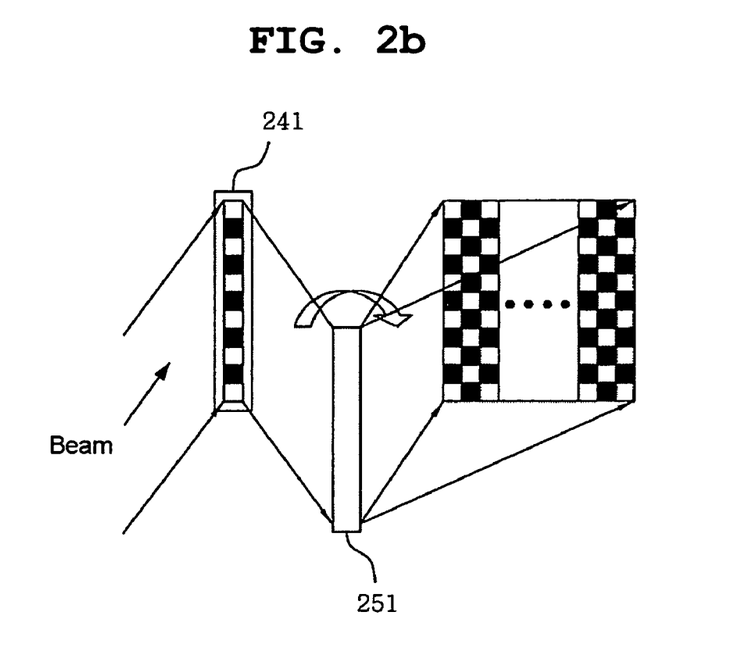
FIG. 2b is a view showing an example of a method of converting a one-dimensional diffracted beam into a two-dimensional diffracted beam using the scanning mirror applied to the present invention.

FIG. 2b is a view showing an example of a method of converting a one-dimensional diffracted beam into a two-dimensional diffracted beam using the scanning mirror applied to the present invention.

As shown in FIG. 2b, the one-dimensional signal beam is generated by the one-dimensional diffractive light modulator 241, and reflected by the scanning mirror 251 in two directions on the same horizontal plane, so that the two-dimensional signal beam is radiated from the scanning mirror 251 to a specific address of the holographic recording medium 220.

The operation of the optical recording apparatus of the present invention having the above construction is described in detail below.

When the light source 211 generates beams, the collimator lens 212 converts the beams generated by the light source 211 into parallel beams, and radiates the parallel beams onto the beam splitter 213. At this time, the beam splitter 213 allows only reference beams, converted into parallel beams by the collimator lens 212, to pass through the focusing lens 214, and reflects beams other than the reference beams in the direction of the cylindrical lens 215.

If the reference beams are radiated onto the reference beam radiation unit 230 in this way, the rotation stage 231 rotates in a preset direction according to the execution of a predetermined program and reflects the reference beams, incident from the light generation and radiation unit 210 at a certain angle, at different angles. Further, the collimator lens 232 converts the reference beams radiated at different angles by the rotation stage 231 into parallel beams, and radiates the parallel beams onto the beam splitter 233. The beam splitter 233 allows the reference beams radiated through the collimator lens 232 at different angles to pass therethrough. The focusing lens 234 focuses the reference beams radiated through the beam splitter 233, and radiates the focused reference beams to a preset address of the holographic recording medium 220.

Further, the one-dimensional diffractive light modulator 241 diffracts and modulates the beams radiated through the cylindrical lens 215 to generate the one-dimensional signal beam. At this time, the one-dimensional diffractive light modulator 241 generates the one-dimensional signal beam comprised of one or more signal arrays. In this case, one signal array generates a two-dimensional signal beam in association with the scanning mirror.

Then, if the collimator lens 242 converts the one-dimensional signal beam radiated from the one-dimensional diffractive light modulator 241 into a parallel beam, and radiates the parallel beam onto the reflector 243, the one-dimensional signal beam is reflected from the reflector 243 and radiated onto the spatial filter 244. At this time, the spatial filter 244 magnifies the diameter of the one-dimensional signal beam to a certain size or above, and radiates the magnified one-dimensional signal beam to the two-dimensional signal beam radiation unit 250.

Since the scanning mirror 251 reflects the radiated one-dimensional signal beam while being turned depending on the horizontal turning operation of the electronic device to which the scanning mirror 251 is attached, the two-dimensional signal beam is radiated from the scanning mirror 251. If the two-dimensional signal beam is radiated in this way, the focusing lens 252 focuses the two-dimensional signal beam and radiates the focused beam to a preset address of the holographic recording medium.

As described above, if the signal beam radiated from the two-dimensional signal beam radiation unit 250 and the reference beams radiated from the reference beam radiation unit 230 are radiated to the preset address of the holographic recording medium 220, data forming the two-dimensional signal beam are recorded at the address. At this time, the two-dimensional signal beam data are recorded only at spots onto which the reference beams are radiated. If the radiation angles of the reference beams radiated to the address are the same, only a piece of data is recorded, while if the radiation angles of the reference beams differ, pieces of data, the number of which is proportional to the number of radiation angles, are recorded.

In the meantime, if the data recorded on the holographic recording medium 220 are radiated onto a focusing lens 270, the focusing lens 270 focuses the data onto a light receiving device 280.

Further, if the beams reflected from the holographic recording medium 220 are radiated onto the beam splitter 233 through the focusing lens 234, the beam splitter 233 reflects the beams in the direction of a focusing lens 290. At this time, the focusing lens 290 focuses the radiated beams onto the photo detector 260.

Hereinafter, for the understanding of principles of generating a phase difference between reference beams generated by the one-dimensional diffractive light modulator 241, the construction and operating characteristics of the one-dimensional diffractive light modulator applied to the present invention are described in detail.

Generally, a piezoelectric/electrostrictive diffractive light modulator, which forms a diffracted beam having a diffraction coefficient by diffracting single beam-shaped linear light incident from a lens and scans the diffracted beam onto a photosensitive surface in a horizontal direction, includes a plurality of actuating cells 320 each formed in a thin film or thick film shape with a predetermined shape.

Figure 3:
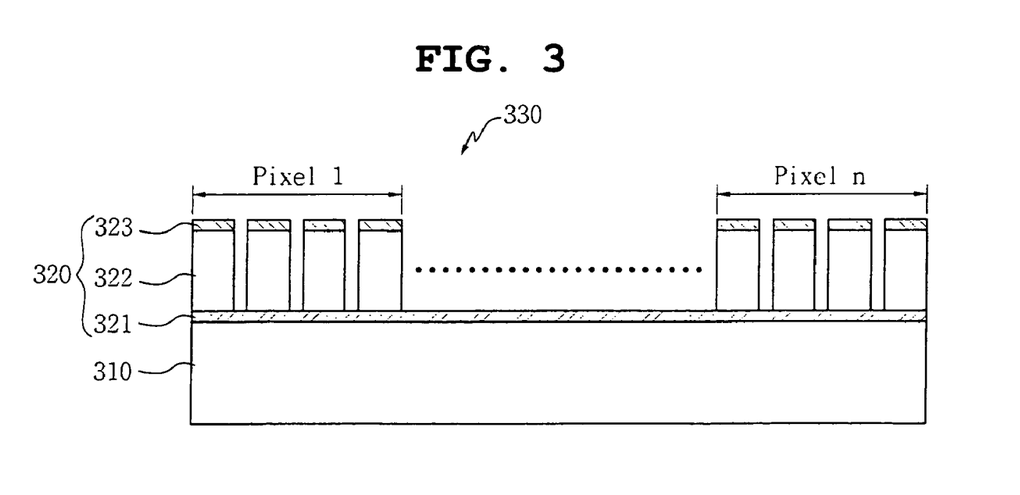
FIG. 3 is a view showing an array of actuating cells constituting a piezoelectric/electrostrictive diffractive light modulator applied to the present invention and having a thick film shape with a vertical length longer than a horizontal length.

That is, as shown in FIG. 3, the piezoelectric/electrostatic diffractive light modulator includes the actuating cells 320, each comprised of a lower electrode 321 formed on a substrate 310, a piezoelectric/electrostrictive layer 322 formed on the lower electrode 321, and an upper electrode 323 formed on the piezoelectric/electrostrictive layer 322, each vertically driven by externally applied drive power, and each formed in a thick film shape with a vertical length longer than a horizontal length.

Figure 4:
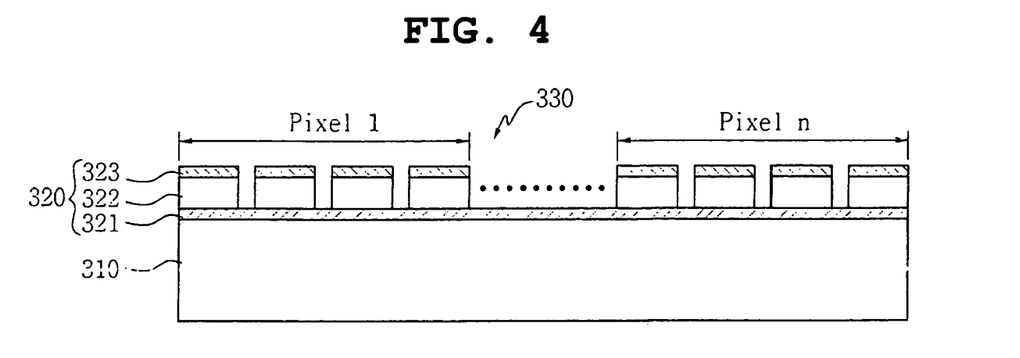
FIG. 4 is a view showing an array of actuating cells constituting a piezoelectric/electrostrictive diffractive light modulator applied to the present invention and having a thick film shape with a horizontal length longer than a vertical length.

In this case, as shown in FIG. 4, the piezoelectric/electrostrictive diffractive light modulator may be constructed to include actuating cells 320 each having a thick film shape with a horizontal length longer than a vertical length in consideration of the structural characteristics of a scanning device.

Figure 5:
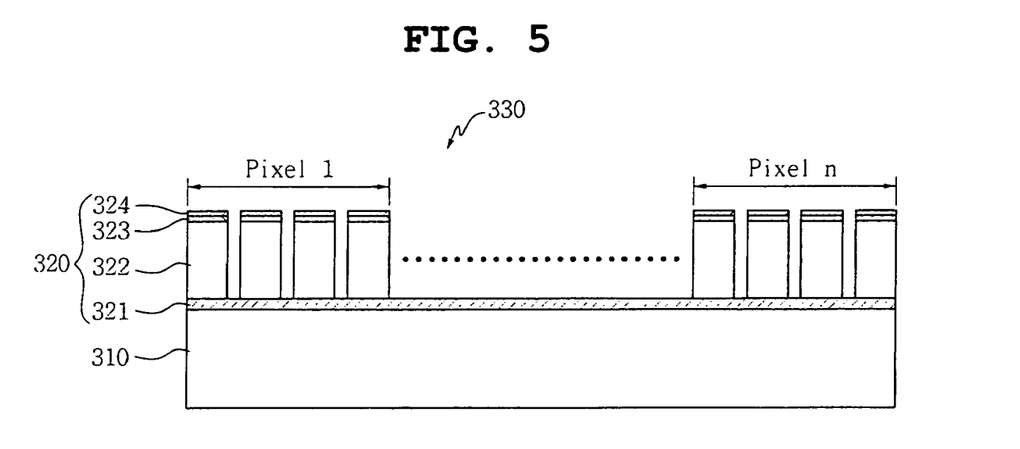
FIG. 5 is a view showing an array of actuating cells, which are applied to the piezoelectric/electrostrictive diffractive light modulator of FIGS. 3 and 4, and on which micromirrors are formed, each actuating cell having a thick film shape with a vertical length longer than a horizontal length.
Figure 6:
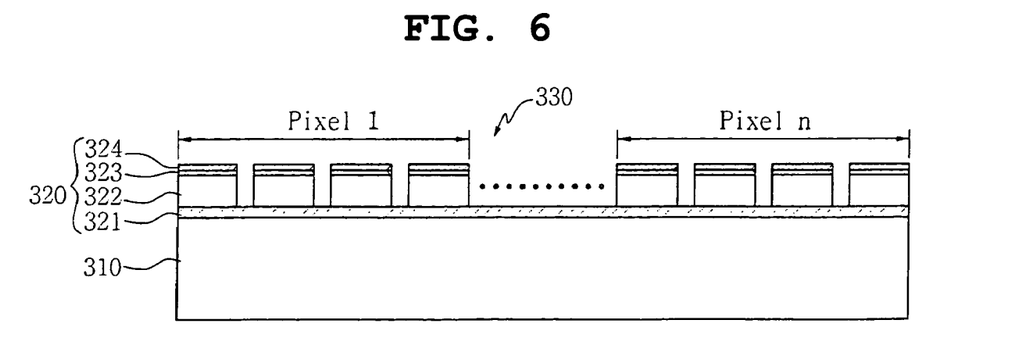
FIG. 6 is a view showing an array of actuating cells, which are applied to the piezoelectric/electrostrictive diffractive light modulator of FIGS. 3 and 4, and on which micromirrors are formed, each actuating cell having a thin film shape with a horizontal length longer than a vertical length.

As shown in FIGS. 5 and 6, the piezoelectric/electrostrictive diffractive light modulator may be constructed to further include a micromirror 324 acting as a reflective surface to maximize the reflection efficiency of light incident on the upper electrode 323.

Figure 7:
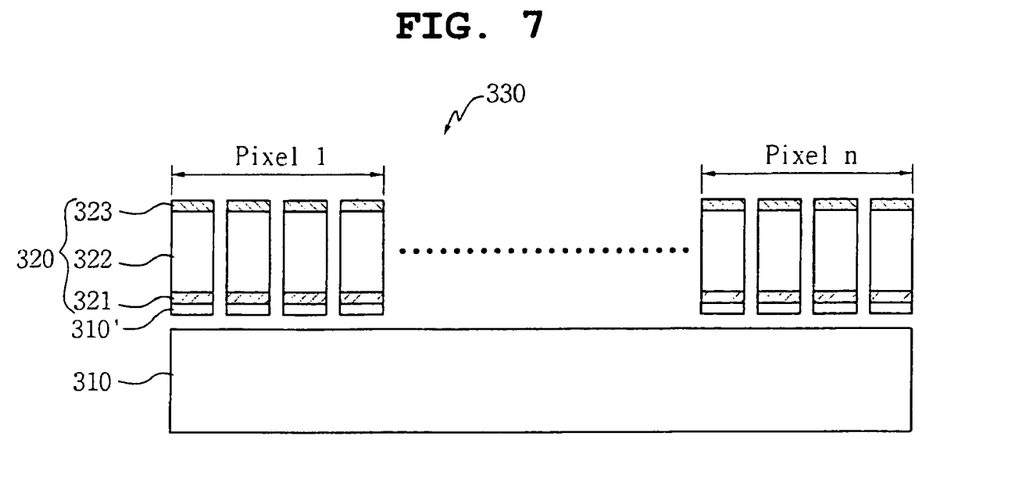
FIG. 7 is a view showing an array of actuating cells constituting a piezoelectric/electrostrictive diffractive light modulator applied to the present invention and having a thin film shape with a vertical length longer than a horizontal length.

As shown in FIG. 7, the piezoelectric/electrostrictive diffractive light modulator includes actuating cells 320 each comprised of a lower electrode 321, a piezoelectric/electrostrictive layer 322 and an upper electrode 323 that are sequentially formed on a silicon substrate 310, on which a depression for providing an air space is formed in a center portion, each horizontally driven by externally applied drive power, and each formed in a thin film shape with a vertical length longer than a horizontal length.

Figure 8:
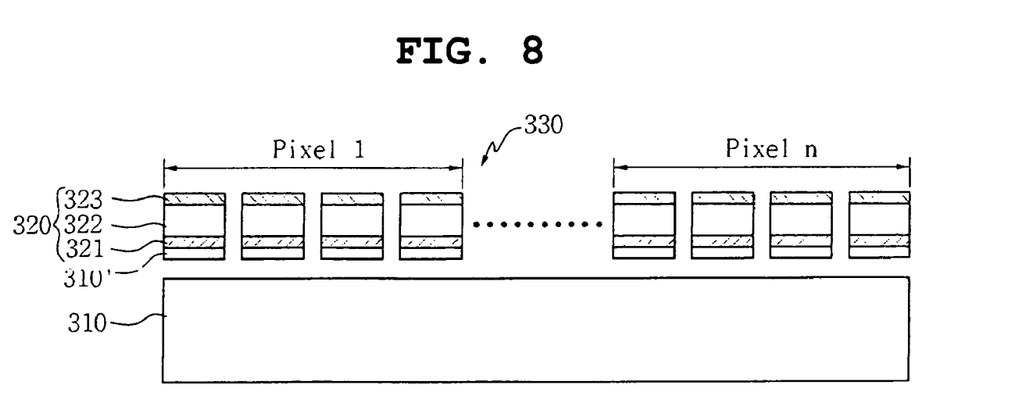
FIG. 8 is a view showing an array of actuating cells constituting a piezoelectric/electrostrictive diffractive light modulator applied to the present invention and having a thin film shape with a horizontal length longer than a vertical length.

In this case, as shown in FIG. 8, the piezoelectric/electrostrictive diffractive light modulator may be constructed to include actuating cells 320 each formed in a thin film shape with a horizontal length longer than a vertical length in consideration of the structural characteristics of a scanning device.

Figure 9:
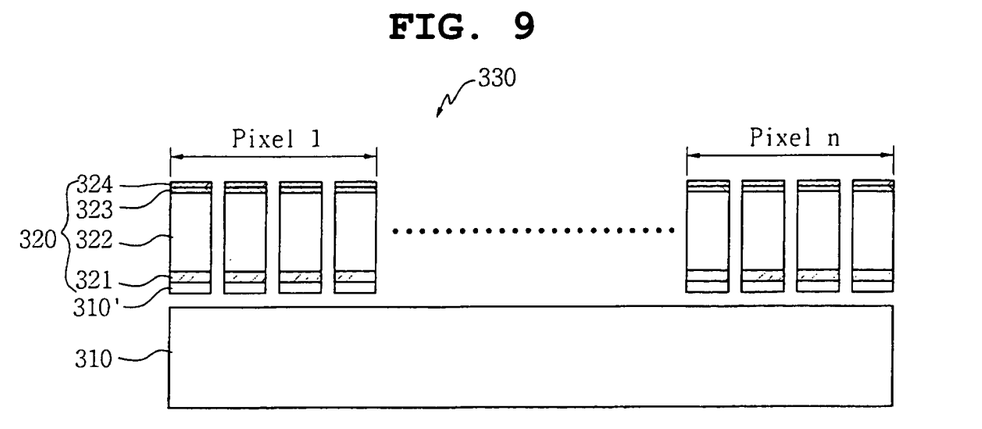
FIG. 9 is a view showing an array of actuating cells, which are applied to the piezoelectric/electrostrictive diffractive light modulator of FIGS. 3 and 4, and on which micromirrors are formed, each actuating cell having a thin film shape with a vertical length longer than a horizontal length.
Figure 10:
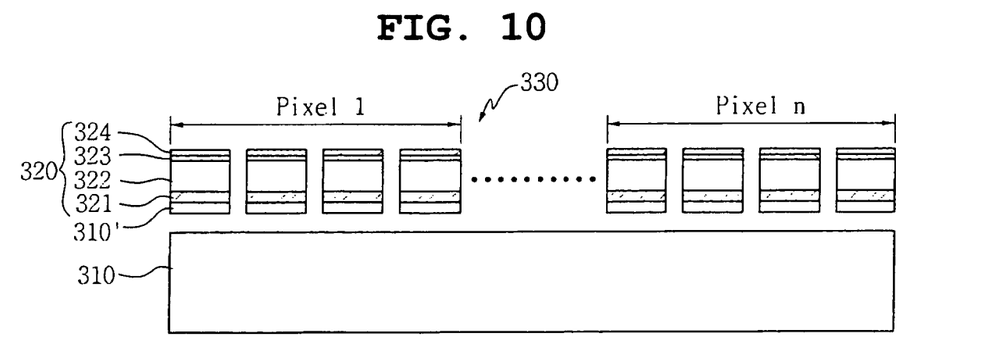
FIG. 10 is a view showing an array of actuating cells, which are applied to the piezoelectric/electrostrictive diffractive light modulator of FIGS. 3 and 4, and on which micromirrors are formed, each actuating cell having a thick film shape with a horizontal length longer than a vertical length.

As shown in FIGS. 9 and 10, the piezoelectric/electrostrictive diffractive light modulator may be constructed to further include a micromirror 324 acting as the reflective surface to maximize the reflection efficiency of light incident on the upper electrode 323.

In this case, the lower electrode 321 is formed on a substrate 310 constituting the actuating cells 320 each having a thick film shape to provide an externally applied drive voltage to the piezoelectric/electrostrictive layer 322, and formed on the substrate 310 by applying a sputtering or evaporation method to an electrode material, such as Pt, Ta/Pt, Ni, Au, Al or Ru02.

Further, the lower electrode 321 is formed on a substrate 310 or lower supporting layer 310' constituting the actuating cells 320 each having a thin film shape, and functions to provide an externally applied drive voltage to the piezoelectric/electrostrictive layer 322.

In this case, the lower supporting layer 310' is evaporated and formed on the silicon substrate 310 to support the piezoelectric/electrostrictive layer 322 of the actuating cells 320 each having a thin film shape, and made of a material, such as $SiO_2$, $Si_3N_4$, Si, $ZrO_2$, or $Al_2O_3$. Such a lower supporting layer 310' may be omitted according to circumstances.

The piezoelectric/electrostrictive layer 322 is formed on the lower electrode 321 at a thickness range of 0.01 to 20.0 μm by applying a wet-type method (screen printing, Sol-Gel coating, etc.) or a dry-type method (sputtering, evaporation, vapor deposition, etc.) to a predetermined piezoelectric/electrostrictive material, the length of which is vertically or horizontally changed depending on a piezoelectric phenomenon occurring by the externally applied drive power, in particular, a material, such as PzT, PNN-PT, ZnO, $P_b$, Zr or titanium.

The upper electrode 323 is formed on the piezoelectric/electrostrictive layer 322 to reflect and diffract light incident from the lens, and, in particular, formed at a thickness range of 0.01 to 3 μm by applying a sputtering or evaporation method to an electrode material, such as Pt, Ta/Pt, Ni, Au, Al or Ru02.

In this case, the upper electrode 323 may act as a micromirror functioning to reflect and diffract an externally applied light signal, or may be constructed to further include the micromirror 324 made of Al, Au, Ag, Pt or Au/Cr, which is a light reflex material, so as to further strengthen the reflection and diffraction for the light signal.

Figure 11A:
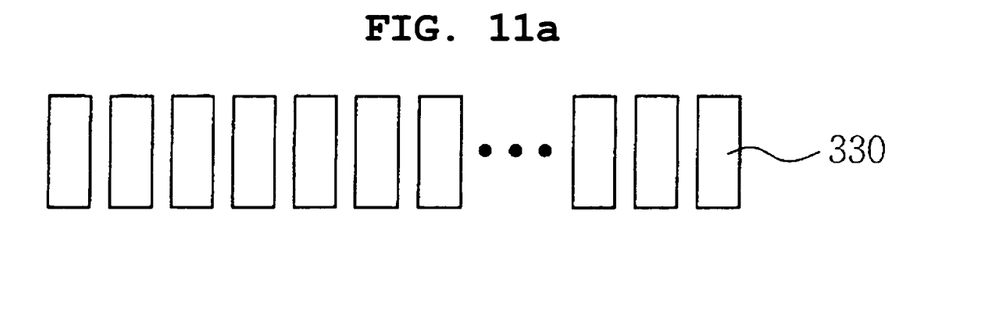
FIG. 11a is a view showing a one-dimensional array of pixels including a certain number of actuating cells and having a shape with a vertical length longer than a horizontal length in the piezoelectric/electrostrictive diffractive light modulator of FIGS. 3 and 4.
Figure 11B:
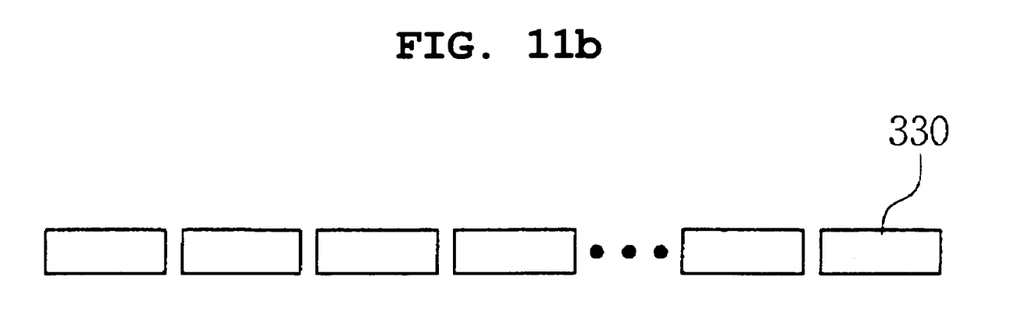
FIG. 11b is a view showing a one-dimensional array of pixels including a certain number of actuating cells and having a shape with a horizontal length longer than a vertical length in the piezoelectric/electrostrictive diffractive light modulator of FIGS. 3 and 4.

In this case, the piezoelectric/electrostrictive diffractive light modulator is driven by the pixel 330 in which a certain number of actuating cells 320 are grouped together. The pixel 330 corresponds to a single dot on a photosensitive surface constituting a predetermined photosensitive member.

That is, as shown in FIGS. 11a and 11b, the piezoelectric/electrostrictive diffractive light modulator includes a certain number of actuating cells 320, and scans diffracted beams, formed by the diffraction of pixels 330 that are one-dimensionally arranged, onto the photosensitive surface, thus simultaneously performing one-dimensional scanning, in detail, for one line.

In this case, FIG. 11a is a view showing an array structure in which pixels each having a vertical length longer than a horizontal length are arrayed one-dimensionally, and FIG. 11b is a view showing an array structure in which pixels each having a horizontal length longer than a vertical length are arrayed one-dimensionally.

As described above, the present invention has the following advantages by converting a signal beam shape using a scanning mirror at the time of recording data on a holographic recording medium, etc.

First, the present invention is advantageous in that it can easily convert a one-dimensional signal beam into a two-dimensional signal beam at the time of recording data on a holographic recording medium.

Second, the present invention is advantageous in that it can greatly reduce required manufacturing processes when a spatial light modulator is manufactured.

Third, the present invention is advantageous in that it minimizes the number of circuit devices used and reduces the manufacturing costs thereof at the time of manufacturing products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical recording apparatus, comprising:
light generation and radiation means for generating beams, and dispersing and radiating the beams in two directions;
reference beam radiation means for converting radiation angles of reference beams incident from the light generation and radiation means at a certain angle and radiating the reference beams having different angles onto a recording medium;
one-dimensional signal beam generation means for diffracting and spatially modulating the beams incident from the light generation and radiation means to generate a one-dimensional signal beam and radiating the one-dimensional signal beam; and
two-dimensional signal beam radiation means for reflecting the one-dimensional signal beam radiated from the one-dimensional signal beam generation means in two directions on the same horizontal plane and radiating a two-dimensional signal beam onto the recording medium.

2. The optical recording apparatus according to claim 1, wherein the light generation and radiation means comprises:
- a light source for generating the beams;
- at least one collimator lens for converting the beams generated by the light source into parallel beams;
- a beam splitter for allowing reference beams among the beams, converted into the parallel beams by the collimator lens, to pass therethrough and reflecting beams other than the reference beams;
- a focusing lens for focusing the beams passed through the beam splitter onto the reference beam radiation means; and
- a cylindrical lens for radiating the beams reflected by the beam splitter onto the one-dimensional signal beam generation means.

3. The optical recording apparatus according to claim 1, wherein the reference beam radiation means comprises:
- a rotation stage for rotating in a preset direction according to execution of a predetermined program, and reflecting the reference beams, incident at a certain angle from the light generation and radiation means, at different angles;
- a collimator lens for converting the reference beams radiated at different angles by the rotation stage into parallel beams and radiating the parallel beams;
- a beam splitter for allowing the reference beams radiated at different angles through the collimator lens to pass therethrough; and
- a focusing lens for focusing the reference beams having different angles passed through the beam splitter and radiating the focused reference beams onto the recording medium.

4. The optical recording apparatus according to claim 3, wherein the beam splitter reflects beams reflected from the recording medium to an external device.

5. The optical recording apparatus according to claim 1, wherein the one-dimensional signal beam generation means comprises:
- a one-dimensional diffractive light modulator for diffracting and spatially modulating the beams radiated from the light generation and radiation means to generate the one-dimensional signal beam;
- a collimator lens for converting the one-dimensional signal beam radiated from the one-dimensional diffractive light modulator into a parallel beam and radiating the parallel beam;
- a reflector for reflecting the one-dimensional signal beam radiated through the collimator lens; and
- a spatial filter for magnifying a diameter of the one-dimensional signal beam reflected through the reflector.

6. The optical recording apparatus according to claim 5, wherein the one-dimensional signal beam radiated after being diffracted and spatially modulated by the one-dimensional diffractive light modulator is comprised of one or more signal arrays.

7. The optical recording apparatus according to claim 1, wherein the two-dimensional signal beam radiation means comprises:
- a scanning mirror for reflecting the one-dimensional signal beam radiated from the one-dimensional signal beam generation means in two directions on the same horizontal plane, and radiating the two-dimensional signal beam; and
- a focusing lens for focusing the two-dimensional signal beam reflected from the scanning mirror and radiating the focused two-dimensional signal beam onto the recording medium.

8. The optical recording apparatus according to claim 7, wherein the scanning mirror is fastened to an external device performing a horizontal turning operation according to a predetermined program.

9. The optical recording apparatus according to claim 7, wherein the scanning mirror is a polygon mirror.

10. The optical recording apparatus according to claim 9, wherein the scanning mirror moves the one-dimensional signal beam radiated from the one-dimensional signal beam generation means at a constant linear velocity.

11. The optical recording apparatus according to claim 7, wherein the scanning mirror is a Galvano mirror.

12. The optical recording apparatus according to claim 11, wherein the scanning mirror moves the one-dimensional signal beam radiated from the one-dimensional signal beam generation means at a non-constant linear velocity.

* * * * *